United States Patent
Tanaka

(10) Patent No.: US 10,679,326 B2
(45) Date of Patent: Jun. 9, 2020

(54) IMAGE DATA PROCESSING APPARATUS AND IMAGE DATA PROCESSING METHOD THAT DETERMINE CONFIDENCE DATA INDICATING A LEVEL OF CONFIDENCE IN A PIXEL VALUE IN HIGH RESOLUTION IMAGE DATA

(71) Applicant: CANON KABUSHIKI KAISHA, Tokyo (JP)

(72) Inventor: Shin Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 685 days.

(21) Appl. No.: 15/355,197

(22) Filed: Nov. 18, 2016

(65) Prior Publication Data
US 2017/0148137 A1 May 25, 2017

(30) Foreign Application Priority Data

Nov. 24, 2015 (JP) .................................. 2015-229063
Oct. 3, 2016 (JP) .................................. 2016-195495

(51) Int. Cl.
*G06T 3/60* (2006.01)
*G06T 3/40* (2006.01)

(52) U.S. Cl.
CPC .................................. *G06T 3/4007* (2013.01)

(58) Field of Classification Search
CPC .................................................. G06T 3/4007
See application file for complete search history.

(56) References Cited

U.S. PATENT DOCUMENTS

| 5,103,306 | A  | * | 4/1992  | Weiman  | G01S 5/163 348/400.1 |
| 6,392,765 | B1 | * | 5/2002  | Sakaida | G06T 3/4007 358/518 |
| 7,889,949 | B2 |   | 2/2011  | Cohen et al. | |
| 9,918,041 | B1 | * | 3/2018  | Zhang   | H04N 7/012 |
| 10,453,249 | B2 | * | 10/2019 | Smirnov | G06T 3/0031 |

(Continued)

FOREIGN PATENT DOCUMENTS

JP H11-168621 A 6/1999

OTHER PUBLICATIONS

Garcia, Frederic, et al. "Pixel Weighted Average Strategy for Depth Sensor Data Fusion," 17th IEEE International Conference on Image Processing (ICIP), 2010, pp. 2805-2808.

*Primary Examiner* — Sean T Motsinger
(74) *Attorney, Agent, or Firm* — Venable LLP

(57) ABSTRACT

An image data processing apparatus includes: an image data acquisition unit for acquiring low resolution image data and high resolution image data; and a confidence data determination unit for determining confidence data which indicates a level of confidence in a pixel value in the high resolution image data. The determination unit determines the level of confidence of a target pixel in the high resolution image data based on a comparison between a first and a second evaluation value. The first evaluation value is determined based on pixel values of neighboring pixels in a pixel position in the low resolution image data corresponding to a pixel position of the target pixel in the high resolution image data. The second evaluation value is determined based on the pixel values of the neighboring pixels, using a method that is different from the first evaluation value.

19 Claims, 12 Drawing Sheets

(56) References Cited

U.S. PATENT DOCUMENTS

| | | | |
|---|---|---|---|
| 2008/0056617 A1* | 3/2008 | Wei | G06T 3/4007 382/300 |
| 2011/0007210 A1* | 1/2011 | Toda | H04N 7/012 348/448 |
| 2011/0007211 A1* | 1/2011 | Toda | H04N 7/012 348/452 |
| 2012/0147205 A1* | 6/2012 | Lelescu | G06T 3/4076 348/218.1 |
| 2012/0169848 A1* | 7/2012 | Bae | G01S 7/4861 348/46 |
| 2012/0182441 A1* | 7/2012 | Sharman | G06T 3/4007 348/222.1 |
| 2012/0183208 A1* | 7/2012 | Sharman | G06T 3/4007 382/162 |
| 2013/0238324 A1* | 9/2013 | Ichikawa | G10L 15/20 704/226 |
| 2014/0132801 A1* | 5/2014 | Sugimoto | H04N 5/23222 348/231.3 |
| 2015/0104074 A1* | 4/2015 | Vondran, Jr. | H04N 13/133 382/106 |
| 2015/0116464 A1* | 4/2015 | Tanaka | G06T 5/002 348/49 |
| 2015/0288851 A1* | 10/2015 | Takashima | H04N 5/142 382/298 |
| 2016/0012566 A1* | 1/2016 | Zha | G06T 3/4007 382/300 |
| 2016/0092501 A1* | 3/2016 | Chakraborty | G06F 16/283 706/46 |
| 2016/0267628 A1* | 9/2016 | Yang | G06T 3/4007 |
| 2016/0305848 A1* | 10/2016 | Boggio | G01M 17/007 |
| 2017/0148137 A1* | 5/2017 | Tanaka | G06T 3/4007 |
| 2018/0232947 A1* | 8/2018 | Nehmadi | G06T 17/05 |

* cited by examiner

FIG. 1

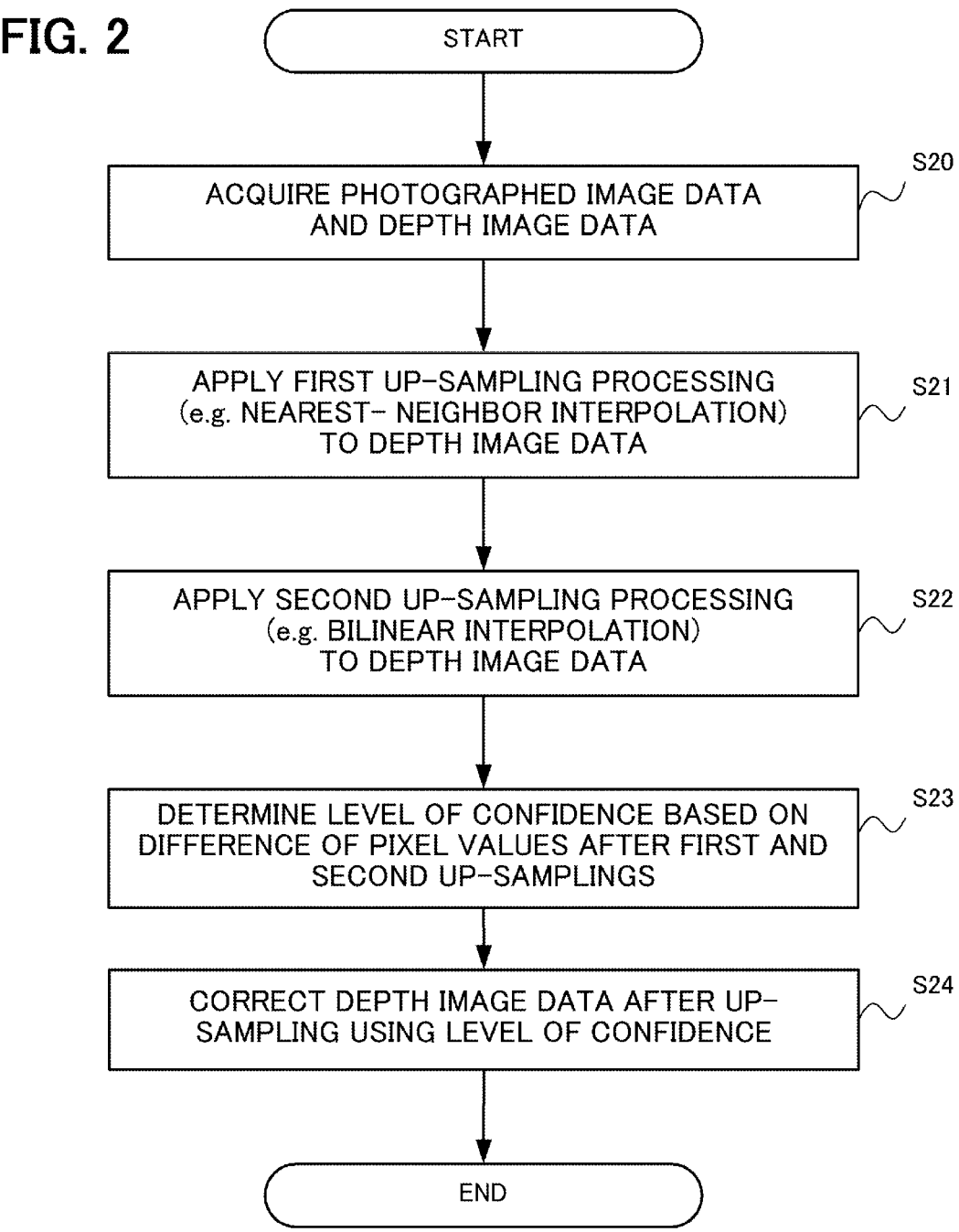

DEPTH IMAGE DATA AFTER
FIRST UP-SAMPLING
(e.g. NEAREST- NEIGHBOR
INTERPOLATION)

501

DEPTH IMAGE DATA AFTER
SECOND UP-SAMPLING
(e.g. BILINEAR INTERPOLATION)

502

CONFIDENCE MAP

503

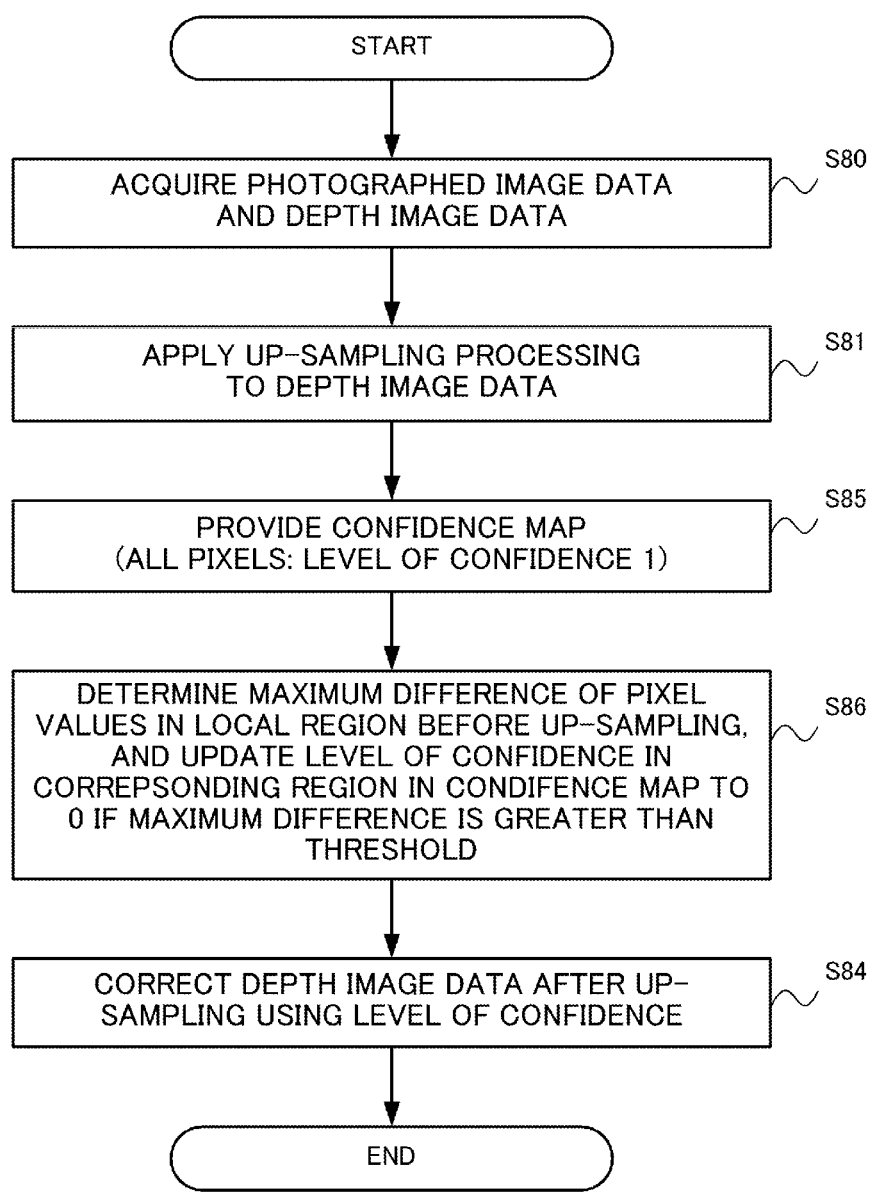

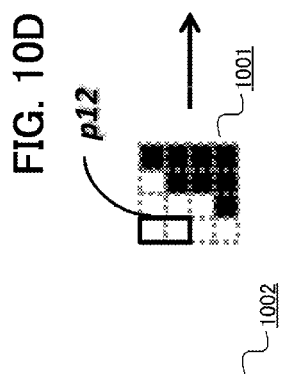
FIG. 10A
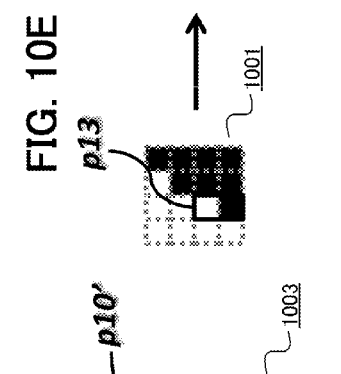
FIG. 10B
FIG. 10C
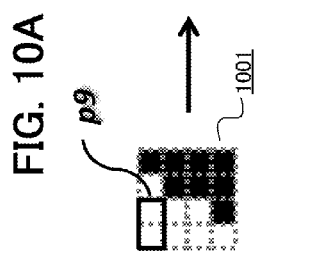
FIG. 10D
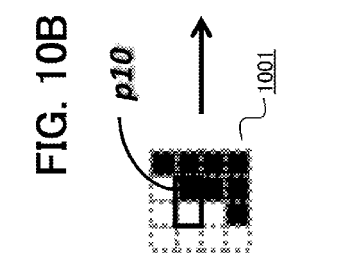
FIG. 10E
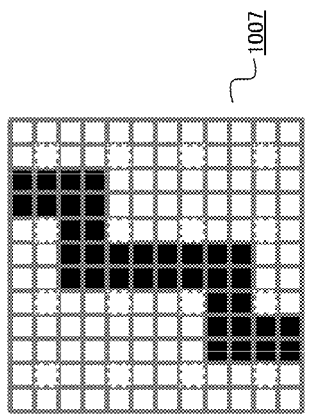
FIG. 10F
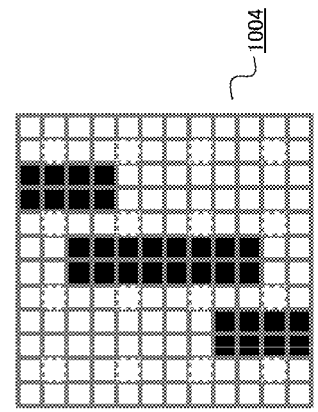

IMAGE DATA PROCESSING APPARATUS AND IMAGE DATA PROCESSING METHOD THAT DETERMINE CONFIDENCE DATA INDICATING A LEVEL OF CONFIDENCE IN A PIXEL VALUE IN HIGH RESOLUTION IMAGE DATA

CLAIM TO PRIORITY

This application claims the benefit of Japanese Patent Application No. 2015-229063, filed on Nov. 24, 2015, and Japanese Patent Application No. 2016-195495, filed on Oct. 3, 2016, which are hereby incorporated by reference herein in their entirety

BACKGROUND OF THE INVENTION

Field of the Invention

The present invention relates to an image data processing apparatus and an image processing method.

Description of the Related Art

Methods of acquiring or calculating a depth image representing the distribution of depth information from an imaging apparatus to an object, or a motion image representing the distribution of relative motion information between the imaging apparatus and the object simultaneously while acquiring a photographed image, have been proposed. The acquired information often has a lower spatial resolution compared with the photographed image. Hence, up-sampling (expansion processing) must be performed to increase the amount of information in accordance with the photographed image. If, however, the up-sampling is performed, information on the boundary portion of the depth or motion cannot be accurately acquired. Therefore, methods to solve this problem have been proposed.

According to U.S. Pat. No. 7,889,949, the depth information is corrected simultaneously with the up-sampling using a joint bilateral filter. According to F. Garcia, et al. "Pixel weighted average strategy for depth sensor data fusion", 17$^{th}$ IEEE International Conference on Image Processing (ICIP) 2010, pages 2805-2808, a Gaussian filter is used for the edge intensity of the depth image, and, based on these filtered values, a confidence map, which indicates the confidence of information, is generated. The up-sampling and the correction of the depth information are performed using the depth information, the confidence map, and the brightness information. According to Japanese Patent Application Laid-Open No. H11-168621, high resolution image data is generated by up-sampling the low resolution image data using a plurality of interpolation methods that are different from one another.

SUMMARY OF THE INVENTION

A problem, however, with the arrangement in U.S. Pat. No. 7,889,949 is that the depth boundary portion becomes blurred. This is because, when the averaging processing is performed using the pixels corresponding to similar colors in the brightness image, the averaging processing is performed using an incorrect depth (depth of different objects having a similar color) near the boundary portion.

In the case of the arrangement in the Garcia, et al. "Pixel weighted average strategy for depth sensor data fusion", 17$^{th}$ IEEE International Conference on Image Processing (ICIP) 2010, pages 2805-2808, publication, an error that may occur in the case of the arrangement in U.S. Pat. No. 7,889,949, is prevented by using the confidence information, but a problem is that accuracy drops because of the influence of the edge extraction method, the Gaussian filter, and the parameter setting in the threshold processing. Another problem is that the edge extraction, the filter processing, and the like, increase the calculation volume.

It is an object of the present invention to provide an image data processing apparatus that can determine the level of confidence in information on each pixel in the expanded image data with high precision and low calculation volume.

According to one aspect of the present invention, an image data processing apparatus includes an image data acquisition unit configured to acquire low resolution image data, and high resolution image data that is image data generated by up-sampling the low resolution image data and a confidence data determination unit configured to determine confidence data that indicates a level of confidence in a pixel value in the high resolution image data. The confidence data determination unit is configured to determine the level of confidence in a pixel value of a target pixel in the high resolution image data based on a comparison between a first evaluation value and a second evaluation value. The first evaluation is determined based on pixel values of neighboring pixels in a pixel position in the low resolution image data corresponding to a pixel position of the target pixel in the high resolution image data. The second evaluation value is determined based on the pixel values of the neighboring pixels, using a method that is different from the method used for determining the first evaluation value.

According to another aspect of the present invention, an image data processing apparatus includes an image data acquisition unit configured to acquire low resolution image data, and high resolution image data that is image data generated by up-sampling the low resolution image data and a confidence data determination unit configured to determine confidence data that indicates a level of confidence in a pixel value in the high resolution image data. The confidence data determination unit is configured to determine the level of confidence in pixels in the high resolution image data corresponding to a local region in the low resolution image data based on a difference between a maximum value and a minimum value of pixel values in the local region.

According to yet another aspect of the present invention, an image data processing method performed by an image data processing apparatus includes an image data acquisition step of acquiring low resolution image data, and high resolution image data that is image data generated by up-sampling the low resolution image data, and a confidence data determination step of determining confidence data that indicates a level of confidence in a pixel value in the high resolution image data. In the confidence data determination step, a first evaluation value is determined based on neighboring pixels of a pixel in the low resolution image data corresponding to a pixel position of a target pixel in the high resolution image data, a second evaluation value is determined based on the neighboring pixels of the pixel in the low resolution image data corresponding to a pixel position of the target pixel in the high resolution image data, using a method that is different from the method used for determining the first evaluation value, and the level of confidence in the target pixel in the high resolution image data is determined based on a comparison between the first evaluation value and the second evaluation value.

According to still another aspect of the present invention, an image data processing method performed by an image data processing apparatus, includes an image data acquisition step of acquiring low resolution image data, and high resolution image data that is image data generated by up-sampling the low resolution image data, and a confidence data determination step of determining confidence data that indicates a level of confidence in a pixel value in the high resolution image data. In the confidence data determination step, the level of confidence in pixels in the high resolution image data corresponding to a local region in the low resolution image data is determined based on a difference between a maximum value and a minimum value of pixel values in the local region.

According to the present invention, the level of confidence in information on each pixel in the expanded image data can be generated at a high precision and a low calculation volume.

Further features of the present invention will become apparent from the following description of exemplary embodiments with reference to the attached drawings.

BRIEF DESCRIPTION OF THE DRAWINGS

FIG. 1 is a block diagram depicting an example of an imaging apparatus that includes an image data processing apparatus according to an embodiment.

FIG. 2 is a flow chart depicting an example of an image data processing method according to Embodiment 1.

FIGS. 8A and 8B are flow charts depicting examples of an image data processing method according to Embodiment 3.

FIGS. 10A to 10F are diagrams depicting a confidence determination method using two neighboring pixels according to Embodiment 3.

DESCRIPTION OF THE EMBODIMENTS

Figure 3A:
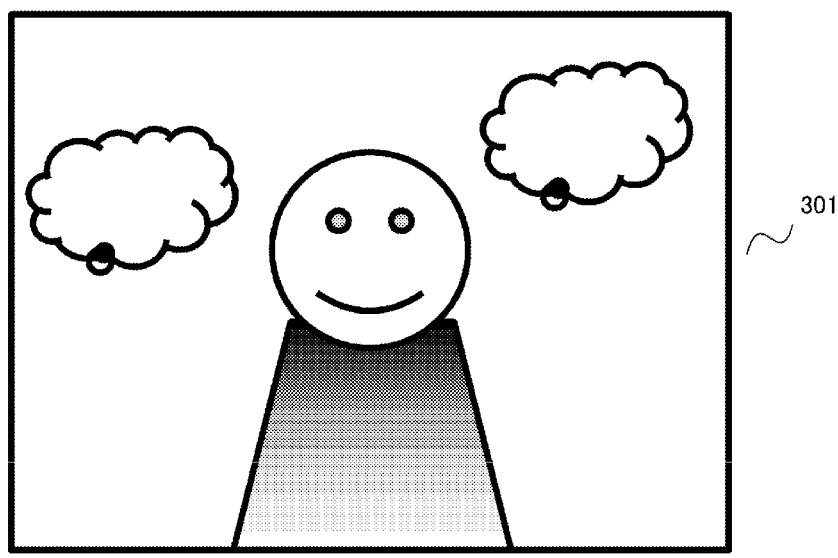
FIGS. 3A and 3B show an example of photographed image data and depth image data according to Embodiment 1.

In this description, "image data" refers to two-dimensional array data in which numerical data is logically arranged in a two-dimensional array. In this description, "image data" is also called a "map". A "pixel" in the image data refers to a position in the two-dimensional array of the image data. Numerical data constituting the image data is not limited to data representing specific information, but includes data representing brightness information, depth information, motion information, and confidence information. The format of the numerical data is not limited to a specific format, but may also be scalar, vector, matrix, or the like. The image data is called "brightness image data", "depth image data", "motion image data", "confidence image data", or the like, in accordance with the information that is handled.

The depth information in this description may either be a relative depth from the focus position to the object, or an absolute depth from the imaging apparatus to the object during photographing. The absolute depth or the relative depth may be the depth on the image side or the object side. The depth may be expressed as an actual spatial depth or by an amount that can be converted into an actual spatial depth, such as a defocus amount and a parallax amount.

The present invention will now be described in detail using the embodiments and drawings, but the present invention is not limited to the configuration of each embodiment. Each embodiment may be appropriately combined.

Embodiment 1

<Configuration>

Figure 1:
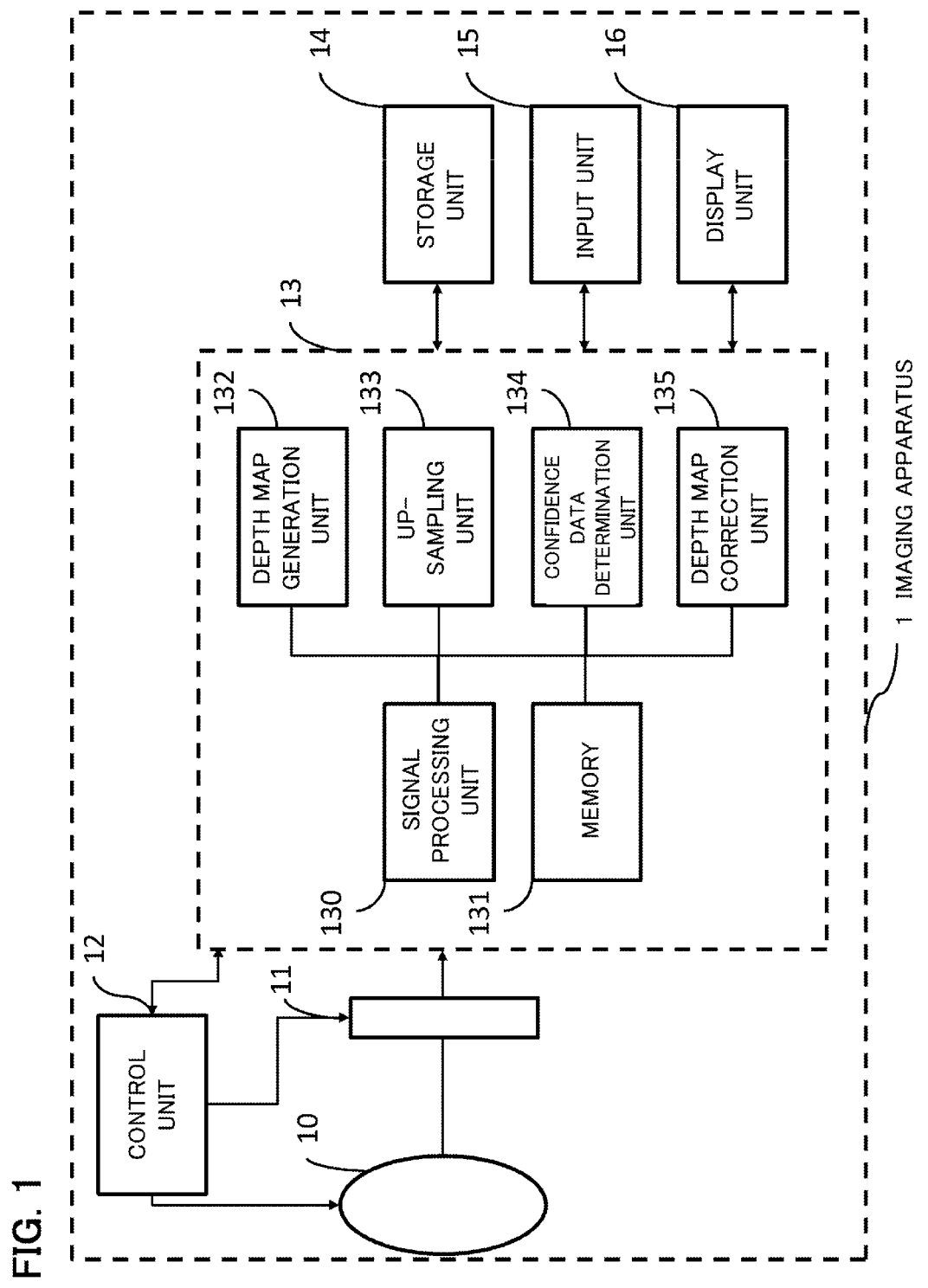

FIG. 1 is a block diagram depicting a configuration of an imaging apparatus 1 according to Embodiment 1 of the present invention. The imaging apparatus 1 has an imaging optical system 10, an image pickup element 11, a control unit 12, an image data processing apparatus 13, a storage unit 14, an input unit 15, and a display unit 16.

The imaging optical system 10 is an optical system that is constituted by a plurality of lenses, and forms an image of incident light on an image plane of the image pickup element 11. The image pickup element 11 is an image pickup element having such an image sensor as a CCD and a CMOS. The image pickup element 11 may be an image pickup element having a color filter, or a monochrome image pickup element, or a triple-plate type image pickup element.

The image data processing apparatus 13 has a signal processing unit 130, a memory 131, a depth map generation unit 132, an up-sampling unit 133, a confidence data determination unit 134, and a depth map correction unit 135. The signal processing unit 130 is a functional unit that performs various types of signal processing, such as AD conversion of an analog signal output from the image pickup element 11, noise removal, demosaicing, brightness signal conversion, aberration correction, white balance adjustment, and color correction. The digital image data output from the signal processing unit 130 is stored in the memory 131, and is displayed on the display unit 16, recorded (stored) in the storage unit 14, and used for, for example, the calculation of depth information and the generation of depth image data. The depth image data represents the distribution of the depth information.

The depth map generation unit 132 acquires photographed image data (brightness image data) from the signal processing unit 130, and acquires the depth information on the object and the depth image data from the photographed image data. The method of acquiring the depth information on an object is not especially limited. Examples of the method of acquiring the depth information are a method of using the photographed image data captured with changing the photographing conditions and having different blur states (depth from defocus method: DFD method), and a method of using photographed image data having different amounts of parallax (stereo method). The time of flight method, the depth from focus method (DFF method), or the like, can also be used. The depth image data generated by the depth map generation unit 132 is stored in the storage unit 14, or is temporarily stored in the memory 131, and is used for the processing in subsequent stages. A correction processing may be performed on the depth image data in accordance with the data acquisition method thereof.

Figure 3B:

In this embodiment, the resolution of the depth map generated by the depth map generation unit 132 is lower than the resolution of the photographed image data (see FIGS. 3A and 3B). In other words, the depth map generation unit 132, according to this embodiment, does not determine the depth information for all the pixels in the photographed image data, but does determine the depth information only for pixels at predetermined intervals.

The up-sampling unit 133 has a function to up-sample the depth map generated by the depth map generation unit 132. Up-sampling is a processing to increase resolution of the image data, and is also called "up-scaling", "up-converting" or "image expansion processing". The up-sampling unit 133 may convert the depth map into any size by up-sampling. However, if the size after up-sampling is larger than the photographed image data based on which depth image data was generated, the correction effect becomes insufficient when the depth map is corrected. If the size after up-scaling is smaller than the photographed image data, such an operation as down-sampling of the photographed image data is required when the depth map is corrected. In this embodiment, it is assumed that the up-sampling unit 133 expands the depth map to a size the same as the photographed image data based on which depth map was generated.

In this description, the depth image data before up-sampling is also called "low resolution depth image data", or "low resolution image data". The depth image data after up-sampling is also called "high resolution depth image data", "high resolution image data", "expanded depth image data" or "expanded image data".

The up-sampling unit 133 can execute the up-sampling processing by two or more different algorithms. The algorithm used for up-sampling (image expansion) may be any standard algorithm. Examples of an algorithm used for up-sampling are: nearest neighbor, bilinear, bicubic and Lanczos-3. For the algorithm, an interpolation using higher-order polynomial approximation than bicubic, or interpolation using a non-polynomial approximation, other than Lanczos-3, may be used.

The confidence data determination unit 134 has a function to calculate the confidence data (confidence map) of the depth map generated by the up-sampling unit 133. The confidence data is data (map) constituted by a level of confidence in each pixel in the depth map. The level of confidence is information to be an index of likelihood of the depth information on each pixel in the depth map. The level of confidence may be a multi-value or a binary value. In this embodiment, it is assumed that the level of confidence has a binary value (whether each pixel is reliable or not).

If the depth map is up-sampled, pixels, particularly, on the depth boundary portion, may have unreliable values. The confidence data determination unit 134 determines the level of confidence in each pixel in the depth map after up-sampling. The confidence determination method by the confidence data determination unit 134 will be described later.

The depth map correction unit 135 has a function to correct depth information on each pixel in the depth image data. To correct the depth information, the acquired photographed image data, the depth image data that is converted into the same size as the photographed image data by the up-sampling unit 133, and the confidence data generated by the confidence data determination unit 134, as well. A concrete correction method will be described later.

The storage unit 14 is a non-volatile storage media where photographed image data, depth image data, confidence data, corrected depth image data, parameter data used for the imaging apparatus 1, and the like, are stored. For the storage unit 14, any storage media that can be written to or read from at high-speed, and that has large capacity, can be used. A flash memory, for example, is preferable.

The input unit 15 is an interface that is operated by the user, and is used to input information to and to change the setting of the imaging apparatus 1. For example, a dial, a button, a switch, a touch panel, or the like, can be used as the input unit 15.

The display unit 16 is constituted by a liquid crystal display, an organic EL display, or the like. The display unit 16 is used to check composition when photographing, viewing photographed or recorded images, and displaying various setting screens and message information, for example.

The control unit 12 has a function to control each unit of the imaging apparatus 1. Examples of the functions of the control unit 12 are automatic focusing using auto focus (AF), changing the focus position, changing the F value (diaphragm), capturing an image, controlling the shutter and flash (not illustrated), and controlling the storage unit 14, the input unit 15, and the display unit 16.

<Method>

Figure 4:
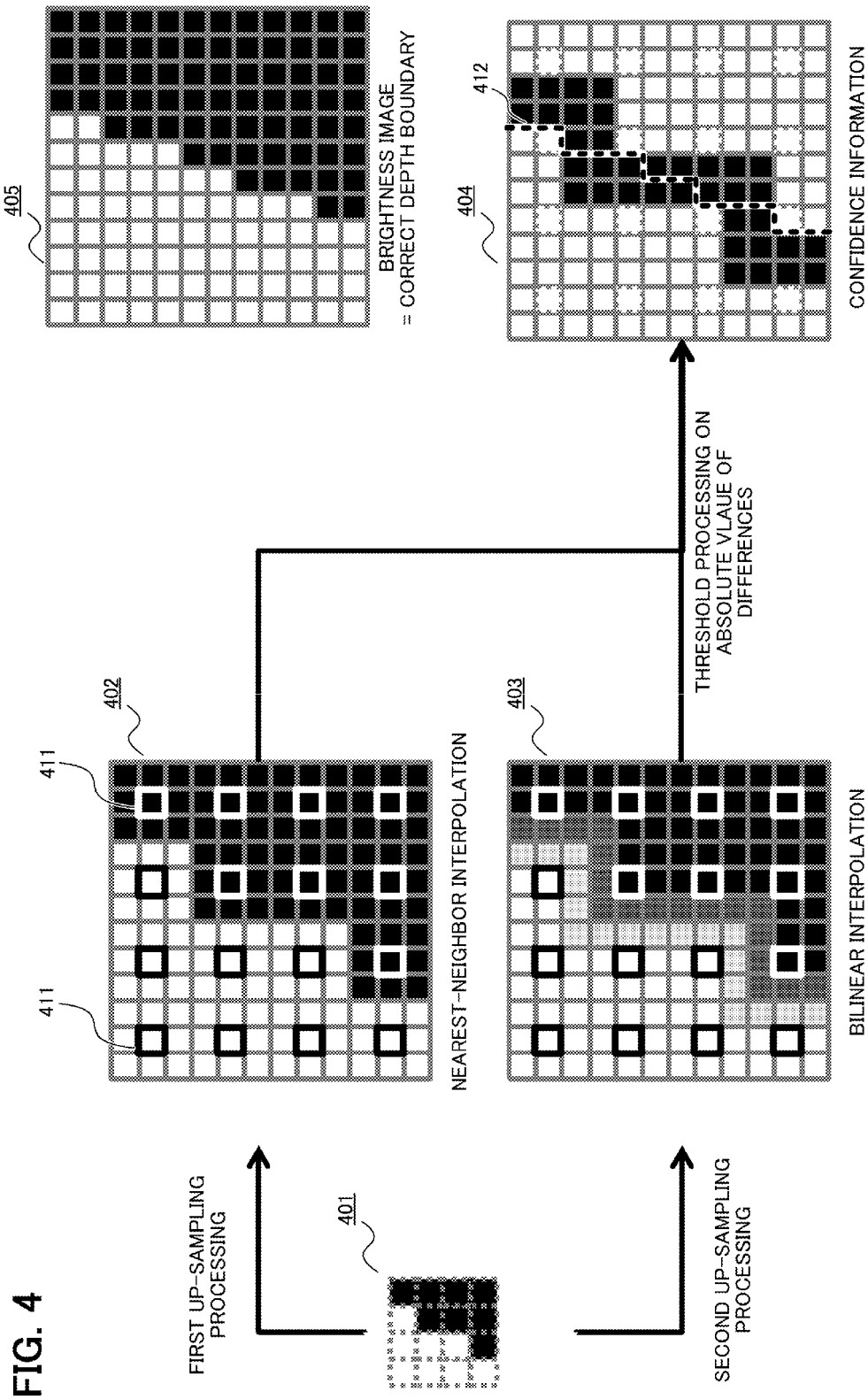
FIG. 4 shows diagrams depicting a confidence determination method according to Embodiment 1.
Figure 5A:
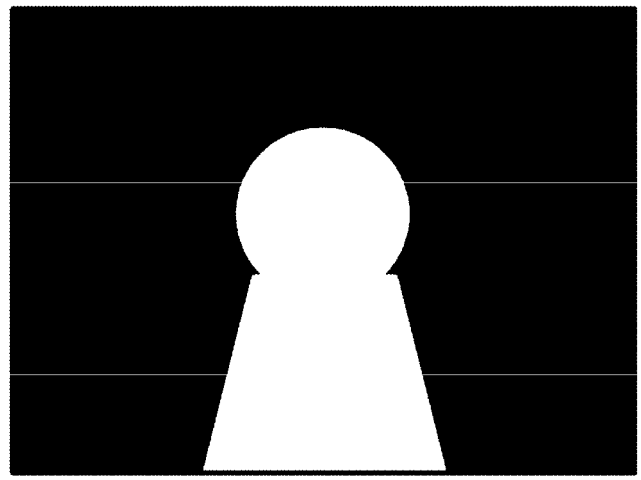
FIGS. 5A to 5C are diagrams depicting the confidence determination method according to Embodiment 1.
Figure 5B:
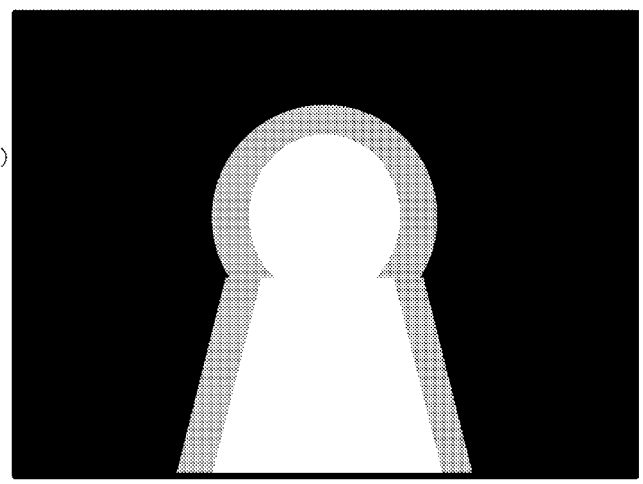
Figure 5C:
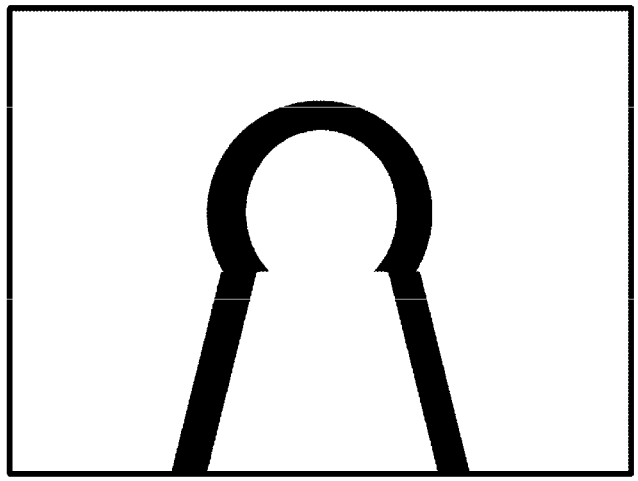

FIG. 2 is a flow chart depicting the flow of the image processing according to this embodiment. FIG. 3A shows an example of the processing target photographed image data, and FIG. 3B shows an example of the processing target depth image data. FIG. 4 shows the data flow in a portion of the pixels in the confidence calculation processing. FIGS. 5A to 5C show examples of the depth image data after the first up-sampling, the depth image data after the second up-sampling, and the confidence map. The image processing performed by the image data processing apparatus 13 according to this embodiment will now be described with reference to these drawings.

In step S20, the up-sampling unit 133 acquires photographed image data 301 (FIG. 3A) and depth image data 302 (FIG. 3B). In concrete terms, the photographed image data 301 is acquired from the signal processing unit 130, and the depth image data 302 is acquired from the depth map generation unit 132.

In FIGS. 3A and 3B, gradation indicates pixel values (brightness values or depth values). In FIG. 3B, it is assumed that all of the pixels of the individual (foreground) have the same depth, and all of the pixels of the background have the same depth, to simplify the description. Actually, however, the depth image data 302 has multi-valued depth information. As mentioned above, the depth image data 302 generated by the depth map generation unit 132 has a lower resolution than that of the photographed image data 301 based on which depth image data 302 was generated.

Then, in step S21, the up-sampling unit 133 performs the first up-sampling processing on the depth image data 302. In this embodiment, the nearest-neighbor interpolation is used for the first up-sampling processing. In the nearest-neighbor interpolation, a value of a nearest pixel having information is set for a pixel that has no information after up-sampling.

An image 401 in FIG. 4 indicates a partial region (4×4 pixels) of the depth image data 302. If up-sampling is performed (3 times×3 times) on the image 401 using the nearest-neighbor interpolation in the first up-sampling processing, the image 401 becomes the image 402. A pixel 411 surrounded by a bold line in the image 402 is a pixel corresponding to a pixel in the image 401, and has a pixel value the same as the corresponding pixel. A pixel value the same as the nearest pixel of the pixel 411 is set for the other pixels.

In this way, in the image 402, pixels that do not correspond to the image 401 are generated and inserted by interpolation. Particularly, in the case of the depth boundary portion, the depth boundary in the image 402 after the up-sampling becomes the intermediate position (equidistant position) in the pixel 411, since the value of the nearest pixel is selected, as mentioned above. This position, however, is not always correct, and it is highly possible that the position of the depth boundary and the pixel values near the depth boundary in the image 402 are incorrect.

FIG. 5A shows the depth image data 501 after up-sampling, which is acquired by performing the first up-sampling processing (nearest-neighbor interpolation) on the depth image data 302.

Then, in step S22, the up-sampling unit 133 performs the second up-sampling on the depth image data 302. In this embodiment, the bilinear interpolation is used for the second up-sampling processing. Any method can be used for the algorithm of the second up-sampling, but the algorithm must be different from the algorithm of the first up-sampling. In the bilinear interpolation, a weighted mean value of the pixel values of neighboring pixels having information is set for a pixel that has no information after the up-sampling. In the case of weighted averaging, the distance between the interpolated pixel and the neighboring pixel is used as the weight.

An image 403 in FIG. 4 is an image acquired by performing up-sampling (3 times×3 times) on the image 401 using the bilinear interpolation. The gradation in FIG. 4 indicates the level of the pixel values (depth values). The depth changes linearly in the depth boundary portion. And, the depth values are blurred and a clear depth boundary does not exist in the image 403 after the up-sampling. This is not always correct, and it is highly possible that the pixel values in this region in the image 403 are incorrect.

FIG. 5B shows the depth image data 502 after up-sampling, which is acquired by performing the second up-sampling processing (bilinear interpolation) on the depth image data 302.

There are many up-sampling methods, but any method can be used for steps S21 and S22. Critical for the up-sampling method used here is the interpolation method that is used for pixels having no information, which are generated by increasing the number of pixels. Standard interpolation methods are, for example, the nearest-neighbor interpolation, the bilinear interpolation and the bicubic interpolation.

Then, in step S23, the confidence data determination unit 134 determines the level of confidence in each pixel of the depth image data, whereby the confidence data is generated. As described above, in this embodiment, the confidence data is binary (reliable or unreliable). The confidence data determination unit 134 compares the depth values of the same pixel portions of the two depth image data, generated after the first up-sampling and after the second up-sampling, determines that the depth value is unreliable if the difference is greater than a threshold, and determines that the depth value is reliable if the difference is the threshold or less. This method of determining the level of confidence is effective, because, if the result of a pixel is different depending on the up-sampling method, it is likely that an accurate depth value was not calculated by the up-sampling. A pixel position refers to the coordinates of a pixel in an image.

In concrete terms, the confidence data determination unit 134 determines the level of confidence W(p) in the pixel position p as follows.

$$W(p) = \begin{cases} 1 & (E(p) \leq U) \\ 0 & (E(p) > U) \end{cases} \quad (1)$$

-continued
$$E(p) = |D_{u1}(p) - D_{u2}(p)| \quad (2)$$

Here $D_{u1}$ denotes the depth image data after the first up-sampling, and $D_{u2}$ denotes the depth image data after the second up-sampling. $D_{u1}(p)$ and $D_{u2}(p)$ denote the pixel values in the pixel position p respectively. E denotes the difference of the depth values in the same pixel position of the two depth image data after the first up-sampling and the second up-sampling. U denotes a determination threshold of the level of confidence.

In this case, W=1 indicates that the pixel value is reliable, and W=0 indicates that the pixel is not reliable. The determination threshold U can be determined based on the depth resolution (data resolution) of the depth image data, or the like. For example, if the dispersion accuracy of the depth values can be approximated by Gaussian distribution, 3σ (3 times the standard deviation) can be set as the determination threshold U. The determination threshold U may be determined based on an allowable error amount in the depth boundary portion. For example, if the allowable error amount for the depth boundary portion is set to within 1% of the maximum value of the measured depth difference, the determination threshold U can be set to 1% of the maximum value of the measured depth difference.

FIG. 5C shows a confidence map determined based on the depth image data after the up-sampling in FIG. 5A and the up-sampling in FIG. 5B. In FIG. 5C, the black portion represents unreliable pixels, and the white portion represents reliable pixels. The image 404 in FIG. 4 is an image generated by expanding a part of the confidence map (portions corresponding to the images 401, 402 and 403). The image 405 in FIG. 4 indicates the corresponding photographed image data. If the brightness boundary of the depth image data 405 indicates an accurate depth boundary, the confidence map 404 correctly indicates that the portion around the depth boundary is a region of which depth values are unreliable (the dotted line 412 in the confidence map 404 shows the actual correct depth boundary).

In this embodiment, the level of confidence is expressed in binary, but the level may have multi-values. If the level of confidence has multi-values, the level of confidence should be determined such that the level of confidence decreases as the difference E increases.

In step S24, the depth map correction unit 135 corrects the depth image data after the up-sampling, based at least partially on the confidence map calculated in step S23. The correction target may be the depth image data on which either the first or second up-sampling was performed, but it is preferable that the correction target is the depth image data up-sampled using a more accurate method out of these methods. In this embodiment, the correction processing is performed on the depth image data 502 up-sampled using the bilinear interpolation.

An example of the correction processing is the following filter processing.

$$D'(p) = \frac{\sum_{q \in Q} G_{\sigma_s}(|p-q|)G_{\sigma_r}(|I(p)-I(q)|)W(q)D(q)}{\sum_{q \in Q} G_{\sigma_s}(|p-q|)G_{\sigma_r}(|I(p)-I(q)|)W(q)} \quad (3)$$

In Expression (3), D denotes the depth information before correction, and D' denotes the depth information after correction. I denotes a brightness value or color information of a pixel in the photographed image data. Reference character p denotes a position of the correction target pixel in the depth image data, and q denotes a position of a peripheral pixel of the correction target pixel p. G is a Gaussian function (σ is a variance), and $G_{\sigma s}$ and $G_{\sigma r}$ may be different Gaussian functions or may be the same Gaussian functions. Q denotes a calculation range, and is appropriately set in accordance with the ratio of the up-sampling.

By this filter processing, the depth data can be corrected using only reliable depth information, without using unreliable depth information. Furthermore, a heavier weight can be set for a pixel as the brightness information or color information of the pixel in the photographed image data becomes similar. Therefore, the depth data can be accurately corrected in accordance with the brightness boundary or color boundary in the photographed image data. If W(p) is 1, that is, if a reliable pixel is the correction target pixel, correction is not required. Hence, only the pixels p of which W(p) is 0 can be corrected, which decreases the calculation volume.

The filter processing (correction processing) using the above Expression (3) can be applied in the same manner, even in a case when the level of confidence has multi-values.

<Advantageous Effect of this Embodiment>

According to this embodiment, the up-sampling is performed using different up-sampling methods, and the difference between the pixel values after each up-sampling is analyzed, whereby the depth boundary (region where level of confidence in the pixel values is low) can be accurately extracted.

Edge pixels are extracted by a conventional edge extraction method, but all of the pixels that may include error cannot be extracted, as shown in the confidence map 404 in FIG. 4. If the difference in the results of applying Gaussian filters having different variance values is used, as in the case of the difference of Gaussian, a region around the depth boundary can be extracted, but each variance values must be appropriately set to make the extraction accurate. The appropriate setting of a variance value is difficult, and if an inappropriate variance value is used, a correct depth boundary, as shown in the confidence map 404, cannot be extracted, and a range that is larger or smaller than the correct range is selected as a region around the depth boundary. Moreover, filter processing is required to extract the depth boundary, which increases the calculation volume.

According to this embodiment, the level of confidence that is required to correct an error in the depth boundary portion caused by up-sampling can be correctly determined. Therefore, the depth image data can be corrected at higher precision. Furthermore, the edge extraction processing and the filter processing are unnecessary, which decreases the calculation volume.

Embodiment 2

Figure 6:
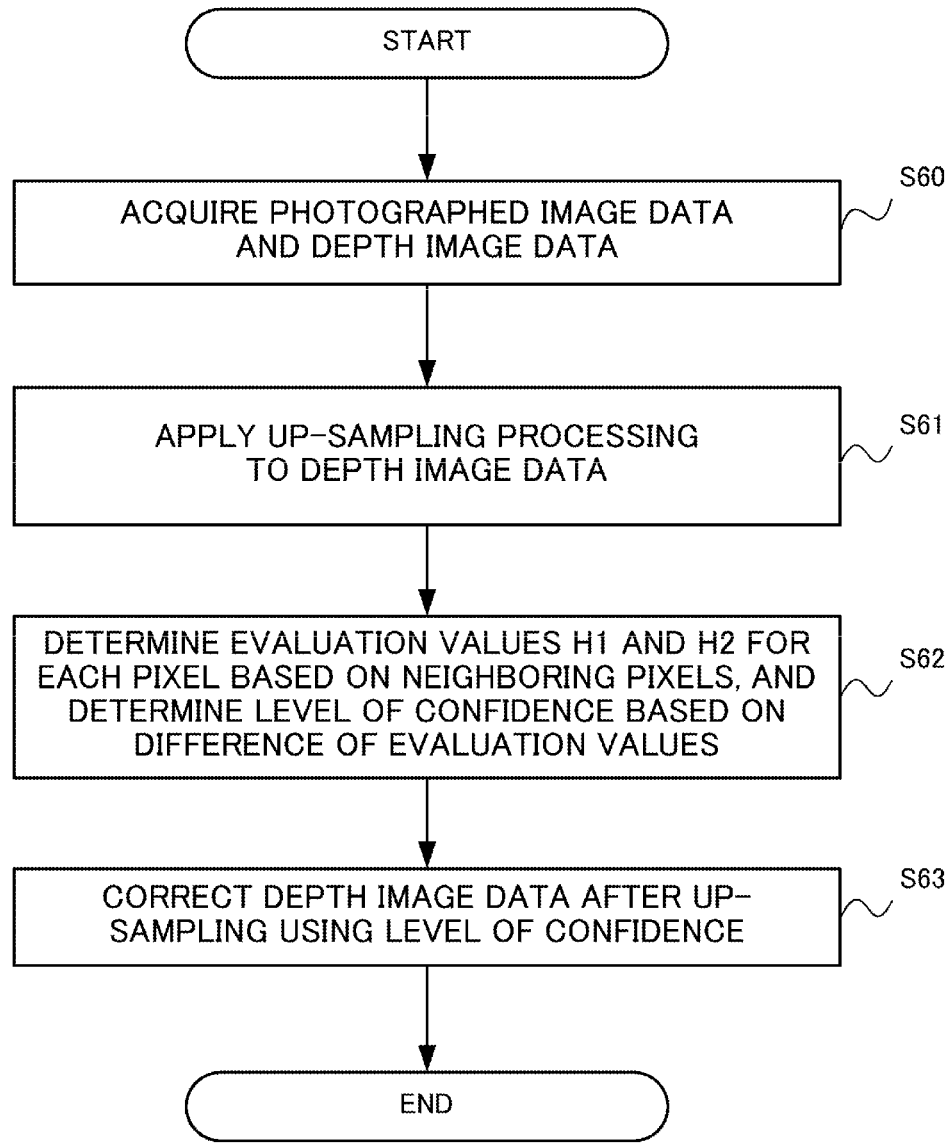
FIG. 6 is a flow chart depicting an example of an image data processing method according to Embodiment 2.

In Embodiment 1, the level of confidence is determined using different up-sampling methods, whereby the depth information is corrected. In Embodiment 2, on the other hand, the confidence data is generated by analyzing the relationship between neighboring pixels in the depth map before up-sampling. The configuration of the image data processing apparatus is the same as the data processing apparatus of Embodiment 1 (FIG. 1), but the processing contents of the up-sampling unit 133 and that of the confidence data determination unit 134 are different. The processing contents will be described with reference to the flow chart in FIG. 6. The image processing method of Embodiment 2 will be described focusing on the difference from Embodiment 1.

In step S60, the up-sampling unit 133 acquires the photographed image data 301 (FIG. 3A) and the depth image data 302 (FIG. 3B). This processing is the same as that in Embodiment 1 (step S20 in FIG. 2).

In step S61, the up-sampling unit 133 performs the up-sampling processing on the depth image data 302. In Embodiment 1, interpolation, which is performed with the up-sampling, is critical. In this embodiment, the interpolation processing is not essential in terms of determining the confidence data. In the up-sampling processing S61 of Embodiment 2, the size of the image data (total number of pixels) increases, but the number of pixels having a value is the same as the number of pixels of the image data before the up-sampling, and the other pixels have no value. A "pixel that has no value" includes the case of the pixel having a value indicating "no value". In step S61, the up-sampling unit 133 may generate the expanded depth image data by performing the up-sampling processing involving interpolation (e.g., bilinear interpolation).

Figure 7:
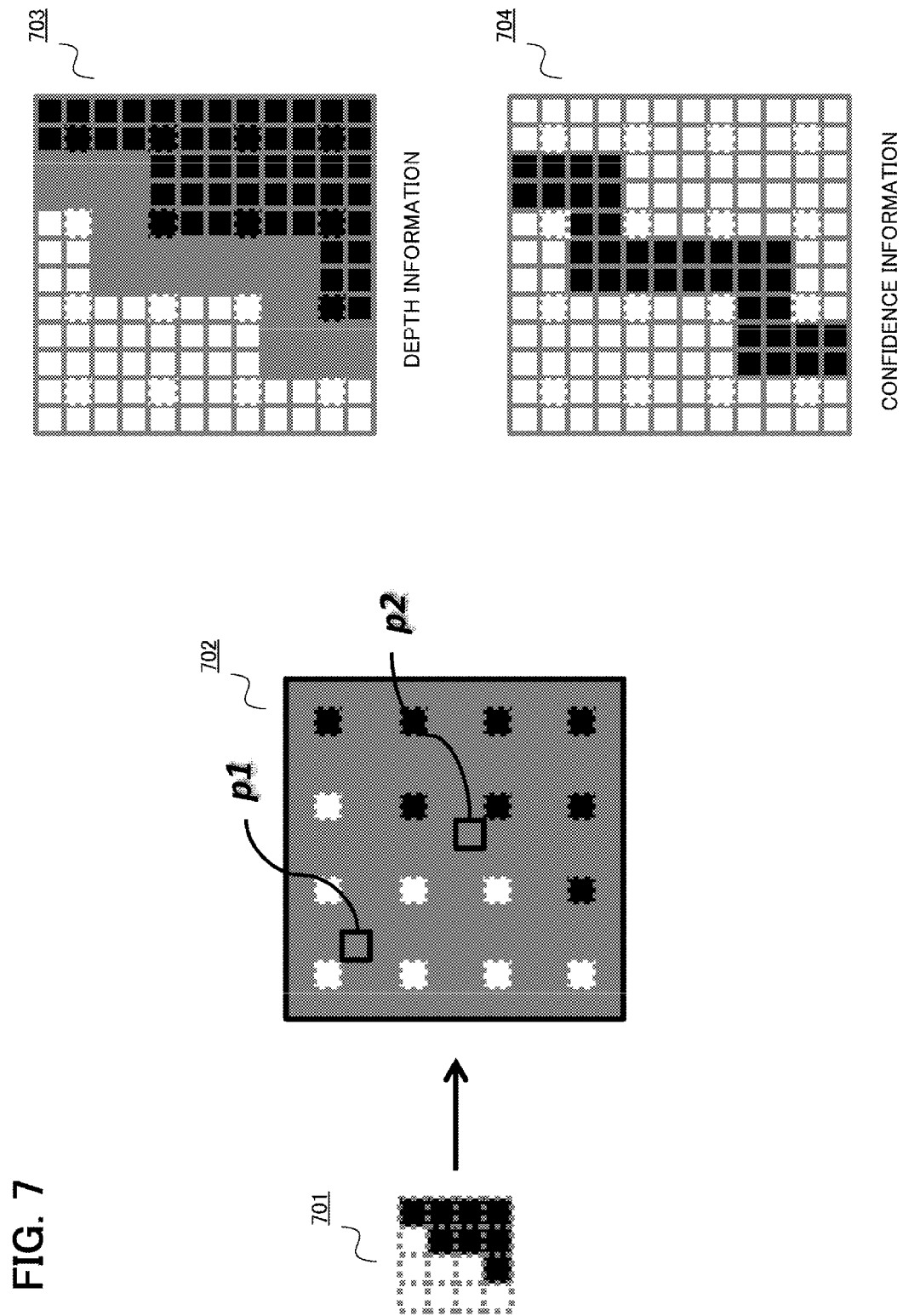
FIG. 7 shows diagrams depicting a confidence determination method according to Embodiment 2.

The processing in step S61 will be described in detail with reference to FIG. 7. In FIG. 7, an image 701 indicates a partial region (4×4 pixels) in the depth image data 302, and an image 702 indicates a region corresponding to the image 701, in the depth image data after the up-sampling processing. Here, it is assumed that the image is expanded to 3×3 times by the up-sampling processing. In an image 702, only sixteen pixels corresponding to the pixels in the image 701 have a value, and the other pixels have no value. The pixel that has no value is indicated by gray in the image 702.

Then, in step S62, the confidence data determination unit 134 determines the level of the confidence in each pixel in the depth image data, and generates the confidence data. In this embodiment, the evaluation values are determined for the calculation target pixel p in the depth image data after the up-sampling by two types of methods, using neighboring pixels having a value, and the level of confidence in the pixel p is determined by comparing these evaluation values.

The evaluation value H(p) for the pixel p is determined as a weighted mean value using a weight coefficient in accordance with the inter-pixel distance, calculated only for the pixels having a value near the pixel p. In concrete terms, the evaluation value H(p) is defined as follows.

$$H(p) = \frac{\sum_{q \in Q'} F(|p-q|)D(q)}{\sum_{q \in Q'} F(|p-q|)} \quad (4)$$

In Expression (4), Q' denotes a set of pixels that are neighboring pixels of the pixel p and have a value. The set Q' can be set in any appropriate way, and can be pixels of which distances from the pixel p are within a predetermined range. For example, the set may be constituted by pixels having a value, located at the upper left, upper right, lower left and lower right of the pixel p, or if the pixel p is between two pixels neighboring in the vertical direction or horizontal direction, the set may be constituted by these two pixels, but the set may include a larger number of pixels. F denotes a function to calculate a weight in accordance with the inter-pixel distance (|p−q|). For example, F is a Gaussian function or a function to set only the nearest pixels in the set of Q' to 1. Determining F(|p−q|) using such a function F is regarded as a calculation of the weight coefficient for the pixel q.

The confidence data determination unit 134 determines, for each pixel, two evaluation values H (H1 and H2) using weight coefficients determined by two different functions F (F1 and F2). The confidence data determination unit 134 determines that the depth value of the pixel p is unreliable if the difference |H1−H2|, which is a difference between the two evaluation values H1 and H2, is greater than a determination threshold, and determines that the depth value of the pixel p is reliable if the difference |H1−H2| is the determination threshold or less.

For example, it is assumed that one function F1 is a Gaussian function having the variance a, and the other function F2 is a function that determines only the nearest pixels in the pixel set Q' to 1. The set Q' is assumed to be a set of four neighboring pixels having a value. To simplify the description, it is assumed that the pixel value (depth value) of a white pixel is one, and the pixel value (depth value) of a black pixel is zero, as shown in the images 701 and 702 in FIG. 7.

The pixel values of the neighboring four pixels included in the set Q', corresponding to the pixel p1 in the image 702 in FIG. 7, are all one. In other words, the evaluation values for the pixel p, that is, the evaluation value H1 using the weight based on the Gaussian function F1 and the evaluation value H2 using the weight based on the function F2 that selects only the nearest pixels, are both 1 (H1=H2=1). This means that the difference between the evaluation values H1 and H2 is zero. Therefore, it is determined that the pixel value (depth value) of the pixel p1 is reliable.

Concerning the pixel p2, the neighboring four pixels included in the corresponding set Q' is constituted by two pixels having the pixel value "1", and two pixels having the pixel value "0". Therefore, the evaluation value H1, using the weight based on the Gaussian function F1, has an intermediate value between zero and one. On the other hand, the evaluation value H2 using the weight based on the function F2, which selects only the nearest pixels, becomes zero, since the pixel value of the nearest pixel of the pixel p is zero. If a difference between the evaluation values H1 and H2 (|H1−H2|), is greater than a threshold, it is determined that the pixel value (depth value) of the pixel two is unreliable.

This determination threshold can be zero. In this case, if the values of the neighboring pixels included in the set Q' are different (the pixels have different values), it is determined that the pixels of the depth image data after up-sampling is not reliable.

However, it is preferable that the determination threshold is a value somewhat greater than zero. If the determination threshold is too small, the region where the depth gradually changes is determined as the depth boundary, that is, an unreliable region. Therefore, it is preferable to set the threshold in accordance with the allowable depth change.

The image 703 in FIG. 7 is a portion corresponding to the images 701 and 702 of the depth map after up-sampling involving interpolation. The image 704 in FIG. 7 is an example of a confidence map that is acquired by determining the level of confidence for all the pixels of the image 702 (703), as described above. As FIG. 7 shows, the depth boundary portion is accurately extracted as a region where the depth values are unreliable.

In step S63, the depth map correction unit 135 corrects the expanded depth image data using the confidence map determined in step S62. The depth map correction processing S63 is the same as Embodiment 1 (step S24 in FIG. 2). Hence, a redundant description will be omitted.

The function F need not be the above mentioned Gaussian function or the function to select the nearest pixel, but may be a function to output a predetermined weight that is in inverse proportion to the depth. The set Q' need not be the neighboring four pixels, but may be neighboring nine pixels, sixteen pixels, or any appropriate number of pixels.

In this embodiment, it is assumed that the level of confidence is a binary value, but the level of confidence may have multi-values just like Embodiment 1. In this case, the level of confidence should be determined so that the level of confidence decreases as the difference between the two evaluation values (|H1−H2|) increases.

If the pixel value of the image data after up-sampling is determined using the interpolation as in the case of Embodiment 1, the value determined by the interpolation is regarded as a value corresponding to the evaluation value H in Embodiment 2. The pixel value determined by the interpolation can be regarded as being the weighted mean value of neighboring pixels (corresponds to pixels having a value) before up-sampling, regardless of what interpolation method is used, including the nearest-neighbor, bilinear and bicubic.

Embodiment 3

In Embodiment 2, the level of confidence is determined based on the pixel value (set Q') of the depth image data before up-sampling corresponding to the neighboring region of the confidence calculation target pixel. In Embodiment 3 as well, the level of confidence is determined based on the set Q', but the level of confidence is determined more simply based on the sameness of the pixel values in the set Q'.

The configuration of the image data processing apparatus is the same as the data processing apparatus of Embodiment 2, but the processing contents of the confidence data determination unit 134 is different. These processing contents will now be described with reference to the flow chart in FIG. 8A. The image processing method of Embodiment 3 will be described focusing on the difference from Embodiment 2.

In step S80, the up-sampling unit 133 acquires photographed image data 301 (FIG. 3A) and depth image data 302 (FIG. 3B). This processing is the same as Embodiment 2 (step S60 in FIG. 6).

In step S81, the up-sampling unit 133 performs the up-sampling processing on the depth image data 302. In Embodiment 3, the up-sampling processing S81 is unnecessary in terms of determining the confidence data. The image data processing apparatus may acquire depth image data, which was generated by up-sampling (expanding) the depth image data acquired in step S80, from an external apparatus, for example.

In step S82, the confidence data determination unit 134 provides a confidence map. The confidence map has the same size as the depth image data after the up-sampling. In this embodiment, the level of confidence is expressed in binary, and the initial value of the level of confidence in each pixel of the confidence map provided in step S82 is assumed to be zero (indicates "unreliable").

In step S83, for each local region (e.g., four pixels) in the depth image data before up-sampling, the confidence data determination unit 134 determines the maximum difference of the pixel values (difference between the maximum value and the minimum value of the pixel values in the local region), and determines the level of confidence based on this maximum difference. In concrete terms, if the maximum difference of the pixel values in the local region is a threshold or less, the confidence data determination unit 134 updates the level of confidence in the region in the confidence map, corresponding to this local region, to one (indicates "reliable"). If the maximum difference of the pixel values in the local region is greater than a threshold, the confidence map is not updated. The confidence data determination unit 134 performs this processing for the entire depth image data before the up-sampling, while shifting the local region in the depth image data. When the local region is shifted, it is preferable that the confidence data determination unit 134 shifts one pixel at a time, allowing for overlapping.

This processing will be described more concretely with reference to FIGS. 9A to 9D. In FIGS. 9A to 9D, an image 901 indicates a partial region (4×4 pixels) of the depth image data (depth map) before up-sampling. The images 902 to 905 indicate the confidence maps of a portion corresponding to the image 901, respectively. In the confidence maps in FIGS. 9A to 9D, a gray pixel indicates confidence zero (unreliable), and a white pixel indicates confidence one (reliable). In the depth maps in FIGS. 9A to 9D, it is assumed that the pixel value (depth value) of a white pixel is one, and the pixel value (depth value) of a black pixel is zero, to simplify description.

In the following description, it is assumed that the determination threshold is a sufficiently small value close to zero, to simplify the description. In an actual situation, however, it is preferable that the determination threshold is a somewhat greater value, considering a case when the object depth is gradually changing. If the determination threshold is set to be too small, the region in which the depth is gradually changing, is determined as a depth boundary, that is, an unreliable region. Therefore, it is preferable to set the threshold in accordance with the allowable depth change.

Figure 9A:
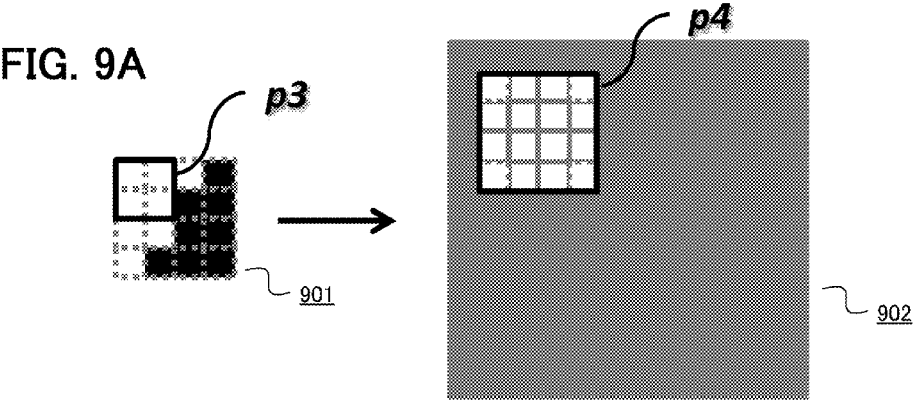
FIGS. 9A to 9D are diagrams depicting a confidence determination method using four neighboring pixels according to Embodiment 3.

In the depth map 901 in FIG. 9A, all of the pixel values of the four pixels in a local region p3 are one. Therefore the maximum difference of the pixel values in the local region p3 is zero, that is, the determination threshold or less. Therefore, the level of confidence in the region p4 (region corresponding to the local region p3) in the confidence map 902 is updated to one. The region p4 is a square region (4×4 pixels) where the four pixels after the up-sampling, corresponding to the four pixels included in the local region p3 (2×2 pixels), are located at the vertexes.

Figure 9B:
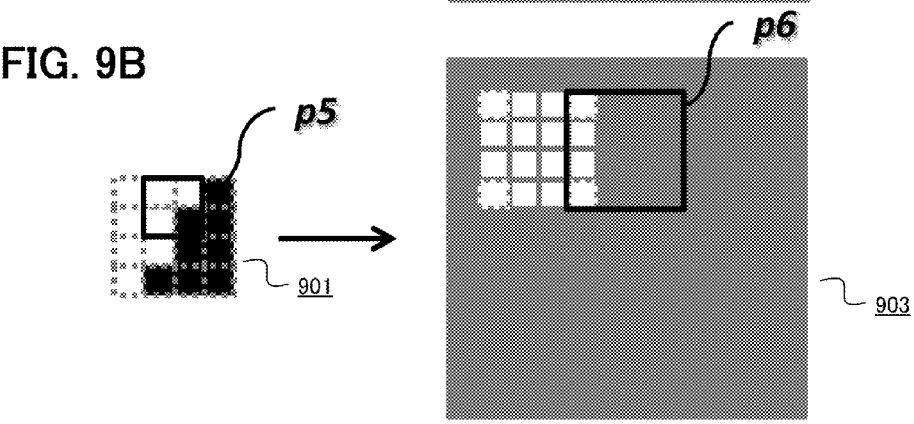

Of the four pixels in the local region p5 in the depth map 901 in FIG. 9B, the pixel values are one in three pixels and zero in one pixel. Hence, the maximum difference of the pixel values in the local region p5 is one, that is, greater than the determination threshold. Therefore, the level of confidence in the region p6 (region corresponding to the local region p5) in the depth map 903 is not updated.

Figure 9C:
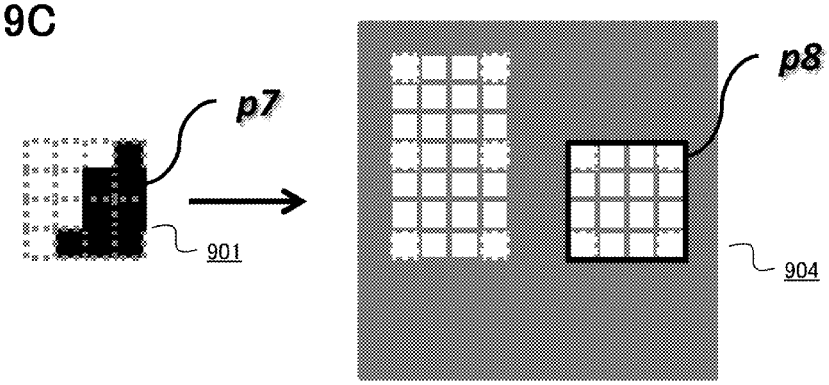

The pixel values of the four pixels in the local region p7 in the depth map 901 in FIG. 9C are all zero. Therefore, the maximum difference of the pixel values in the local region p7 is zero, that is, the determination threshold or less. Therefore, the level of confidence in the region p8 (region corresponding to the local region p7) in the depth map 904 is updated to one.

Figure 9D:
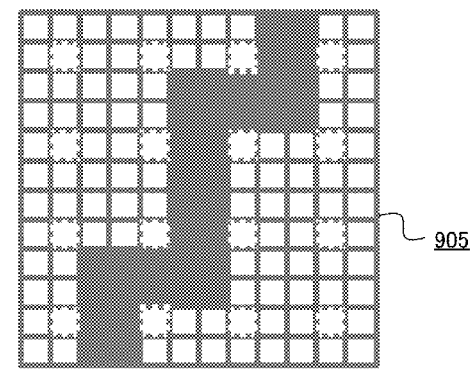

FIG. 9D shows a confidence map 905, which is finally acquired by performing the above mentioned processing for the entire depth map. It is clearly shown that the depth boundary in the depth map is accurately extracted as an unreliable region. The depth maps and the confidence maps shown in FIGS. 9A to 9D show a partial region respectively, and the level of confidence in the peripheral region in the confidence map 905 is determined based on the local region extending into the depth map 901, and a depth map that is not illustrated.

In step S84, the depth map correction unit 135 corrects the expanded depth image data using the confidence map determined in step S83. The depth map correction processing S84 is the same as that in Embodiment 1 (step S24 in FIG. 2). Hence, a redundant description will be omitted.

In the above description, the initial values of the level of confidence in the depth map are set to zero, and if the maximum value of the pixel values in a local region is a threshold or less (reliable), the level of confidence in the corresponding region in the depth map is updated to one. However, the initial values of the level of confidence in the depth map may be set to one, and if the maximum value of the pixel values in a local region is greater than a threshold (unreliable), the level of confidence in the corresponding region in the depth map may be updated to zero.

In the above description, the local region is a square constituted by four pixels, but the shape of the local region is not limited to this. For example, the local region may be a larger square. And, the local region may be rectangular instead of a square. For example, the local region may be a region constituted by two neighboring pixels. In this case, it is preferable to generate the confidence map by shifting the local region constituted by two pixels arranged in the horizontal direction, and the local region constituted by two pixels arranged in the vertical direction respectively. The region in which the level of confidence is updated (corresponding to the local region) need not be a partial region acquired by up-sampling the local region, as described above, but may be a region having a different shape.

Figure 8A:
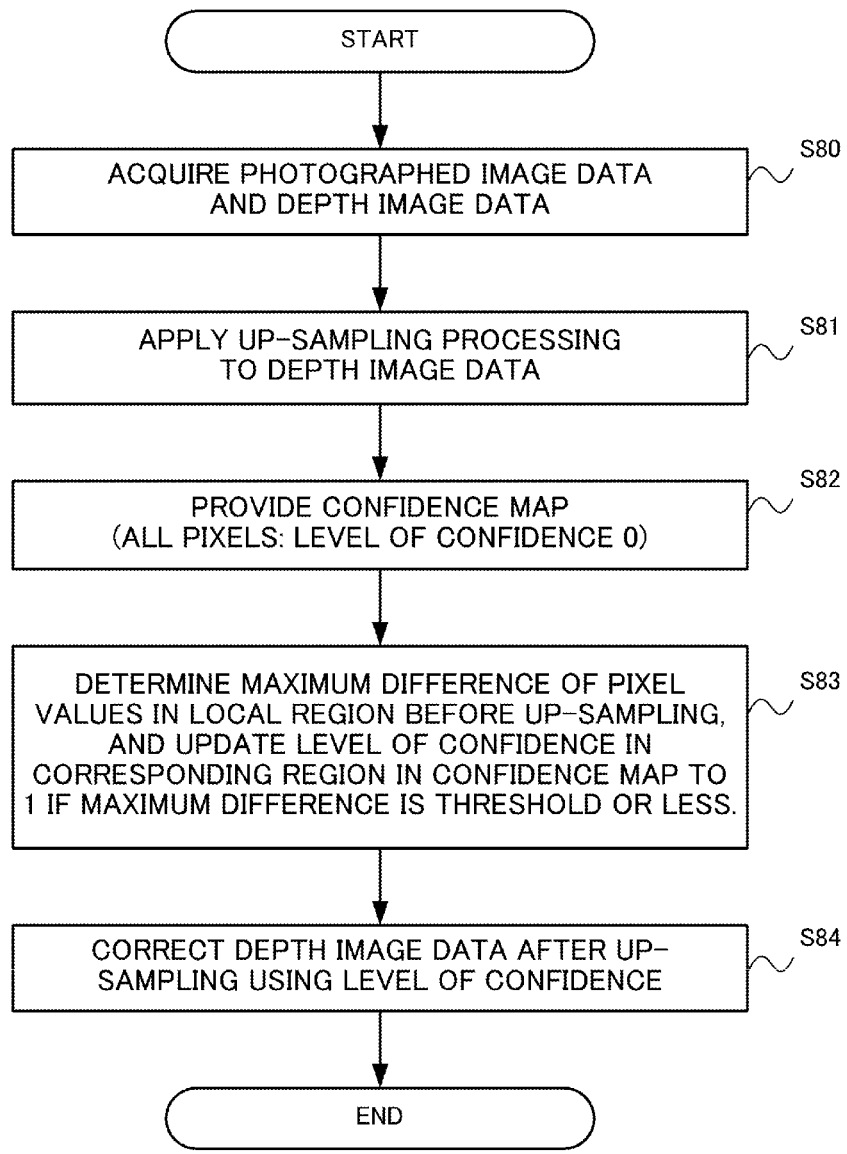

An operation example in the case when the local region is constituted by two neighboring pixels will be described with reference to FIG. 8B and FIGS. 10A to 10F. FIG. 8B is a flow chart depicting the image processing method according to a modification of this embodiment. The difference from the flow chart in FIG. 8A is that a confidence map in which the initial values are one is provided in step S85, and the level of confidence is updated to zero if the maximum difference is greater than the threshold in step S86.

In FIGS. 10A to 10F, an image 1001 indicates a partial region (4×4 pixels) of the depth image data (depth map) before up-sampling. The images 1002 to 1007 indicate the confidence maps of a portion corresponding to the image 1001. In the confidence maps in FIGS. 10A to 10F, a gray pixel indicates confidence zero (unreliable), and a white pixel indicates confidence one (reliable). In the depth maps in FIGS. 10A to 10F, it is assumed that the pixel value (depth value) of a white pixel is one, and the pixel value (depth value) of a black pixel is zero, to simplify this description. It is also assumed that the determination threshold is a sufficiently small value that is close to zero, to simplify this description.

Here, the level of confidence is determined first using a local region constituted by two pixels arranged in the horizontal direction (FIGS. 10A to 10C), then, using a local region constituted by two pixels arranged in the vertical direction (FIGS. 10D to 10F). This sequence may be reversed, or the level of confidence may be determined by alternately using the local region in the horizontal direction and the local region in the vertical direction.

In FIG. 10A, the pixel values in the local region p9 are both one. Hence, the confidence map 1002 is not updated. In FIG. 10B, the pixel values in the local region p10 are different. Hence, the confidence map 1003 is updated so that the level of confidence in the region p11, corresponding to the local region p10, becomes zero (unreliable). Here, the region p11 is assumed to be a region (2×5 pixels) included in a rectangular region (excluding the periphery) that is sandwiched by two pixels p10' corresponding to the two pixels in the local region p10, and where four pixels corresponding to the two neighboring pixels above and two neighboring pixels below the two pixels in the local region p10 are at the vertexes. This is because, when the local region constituted by the pixels arranged in the horizontal direction is used, it is determined whether there is an edge in the vertical direction. The confidence map 1004 shown in FIG. 10C is the confidence map that is acquired by performing the above operation on the entire depth image data.

Then, the same operation is performed using the local region constituted by the pixels arranged in the vertical direction. In FIG. 10D, the pixel values in the local region p12 are both one. Hence, the confidence map 1005 is not updated. In FIG. 10E, the pixel values in the local region p13 are different. Hence, the confidence map 1006 is updated, so that the level of confidence in the region p14, corresponding to the local region p13, becomes zero (unreliable). The region p14 corresponding to the local region p13 is defined in the same manner as the region p11 corresponding to the local region p10. The confidence map 1007 shown in FIG. 10F is the final confidence map acquired by performing the above operation on the entire depth image data.

According to this embodiment, the depth boundary after up-sampling can be extracted merely by determining the maximum difference of neighboring pixels in the depth image data. In other words, the level of confidence can be determined with less calculation volume.

Embodiment 3 can be regarded as an embodiment in which the two evaluation values in Embodiment 2 are determined as follows. In other words, in Embodiment 3, one evaluation value is the maximum difference of the pixel values in the local region (neighboring pixels) in the depth image data before up-sampling corresponding to the confidence calculation target pixel, and the other evaluation value is zero regardless of the confidence calculation target pixel.

In Embodiment 3, however, there may be a plurality of corresponding local regions (neighboring regions) in the depth image data before up-sampling, for one pixel (confidence calculation target pixel) in the depth image data after up-sampling. Therefore, in Embodiment 3, a level of confidence may be determined for one confidence calculation target pixel, based on the evaluation value differences of a plurality of neighboring regions (local regions). In the case when the confidence map in which the level of confidence is zero is provided as the initial values (FIG. 8A), the level of confidence in the confidence calculation target pixel is determined as one, if any one of the evaluation value differences of the plurality of neighboring regions is a threshold value or less. In the case when the confidence map in which the level of confidence is one is provided as the initial values (FIG. 8B), the level of confidence in the confidence calculation target pixel is determined as zero, if any one of the evaluation value differences of the plurality of neighboring regions is greater than a threshold.

Embodiment 4

Figure 11:
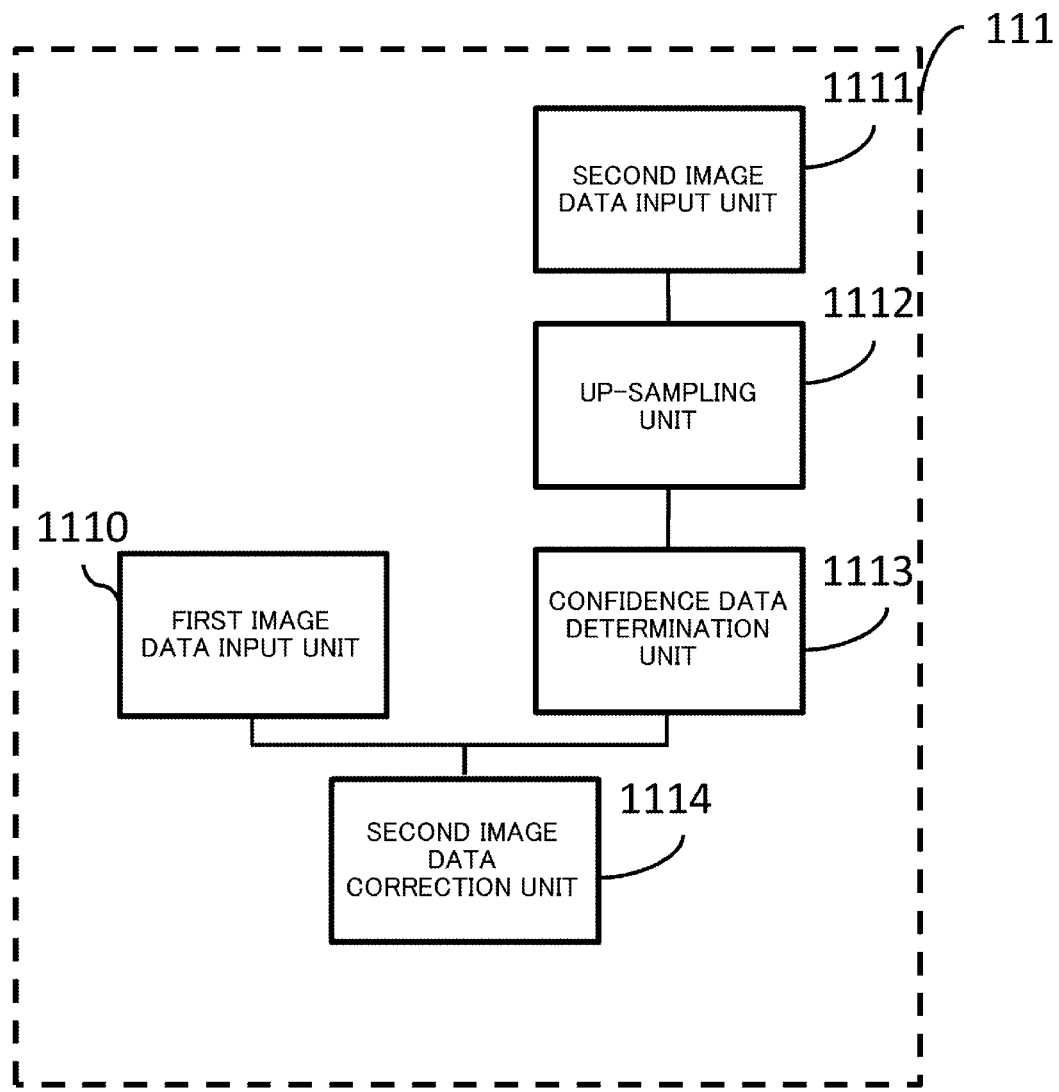
FIG. 11 is a block diagram depicting an example of a data processing apparatus according to Embodiment 4.

In Embodiments 1 to 3, the photographed image data and the depth image data are used to generate the confidence data and to correct the depth information. Embodiment 4, on the other hand, shows that the confidence data can be generated and the correction processing can be performed using data other than the photographed image data and the depth image data. FIG. 11 is a functional block diagram of an image data processing apparatus 111 according to Embodiment 4. The flow chart of the image processing method performed by the image data processing apparatus 111 according to Embodiment 4 is the same as the flow charts of Embodiments 1 to 3. The image processing method according to Embodiment 4 will be described focusing on the differences from Embodiments 1 to 3.

The image data processing apparatus 111 has a first image data input unit 1110, a second image data input unit 1111, an up-sampling unit 1112, a confidence data determination unit 1113, and a second image data correction unit 1114. Image data to be the reference (hereafter "first image data") is input to the first image data input unit 1110. The first image data may be any image data. The first image data may be brightness image data, but may also be, for example, already up-sampled and corrected depth image data. The first image data may also be image data having information on infrared light, polarization, or the like, for example. When the brightness image, or the like, is input, the first image data input unit 1110 may be an imaging apparatus, as in the case of FIG. 1, and when the depth image data or the like, is input, the data input unit may include a data generation unit.

Image data that corresponds to the first image data and has resolution lower than the first image data (hereafter "second image data") is input to the second image data input unit 1111. The second image data can be any image data if the above conditions are satisfied, such as depth image data, image data having such information as infrared light or polarization, motion image (Optical Flow), and segmentation image. The motion image is data that indicates the motion of the object (in some cases, motion of the camera may also be included). The motion image has a data format that holds the velocity in the horizontal direction (x direction) and the vertical direction (y direction) for each pixel, for example. The motion image is normally generated by capturing two brightness images with a certain time interval, calculating the most likely positions of the object by template matching of these two images.

The segmentation image is data generated by segmenting the image for each photographed object. For example, an individual, a vehicle, a building, and the like, are segmented in pixel units, and an index is assigned to each segment. Data generated by segmenting an image in accordance with an attribute (e.g., a similar color), instead of in object units (e.g., an individual, or a vehicle), is also a segmentation image. Data generated by segmenting in accordance with the depth, such as foreground, background and intermediate layer therebetween, without using specific depth values, is also called a "segmentation image".

The second image data may be input from an apparatus other than the image data processing apparatus 111, or may be calculated by the image data processing apparatus 111 based on other information, including the first image data.

As described above, if the second image data has a resolution lower than the first image data and the first image data is data to be a reference for correction, the data processing can be performed in the same manner as Embodiments 1 to 3. Depending on the data, there may be a plurality of correction target data, but the basic processing is still the same. For example, in the case of a motion image, the correction processing for the motion image in the horizontal direction and the correction processing for a motion image in the vertical direction are independently performed using the same method.

According to Embodiment 4, the level of confidence can be set by applying the present invention to data having an error caused by up-sampling, even if it is not depth image data, thereby the data can be efficiently corrected to data having even higher precision.

Embodiment 5

In Embodiments 1 to 4, the image data processing apparatus acquires or generates the first image data (e.g., brightness image data) and the second image data having a resolution lower than the first image data (e.g., depth image data), and performs un-sampling on the second image data. In other words, in Embodiments 1 to 4, the depth map generation unit 132 and the up-sampling unit 133 correspond to the image data acquisition unit, and acquires the second image data having high resolution.

However, what is required is that expanded second image data having high resolution can be used, and the acquisition method thereof is not especially limited. For example, the image data processing apparatus may acquire second image data having a low resolution, and expand this data to generate the second image data having a high resolution. Further, the image data processing apparatus may acquire this expanded second image data from an external apparatus. In this case, in Embodiments 1 and 2, when the level of confidence is determined by performing up-sampling by two types of methods, the image data processing apparatus may perform up-sampling using only one method that is different from the method used for the input data. This is because the confidence map can be generated using both the up-sampled image data that was input and the up-sampled image data that was generated.

In Embodiment 3, when the up-sampled image data is not required to generate the confidence map, the image data processing apparatus need not include the up-sampling unit.

In the case when only the confidence map is generated and the correction processing is not performed on the up-sampled second image data, or when the first image data is not used for the correction processing, the image data processing apparatus need not acquire the first image data.

Embodiment 6

The above mentioned image processing method according to the present invention can be suitably applied to such an imaging apparatus as a digital camera or a camcorder, and to an image processing apparatus or a computer that performs image processing on image data acquired by an imaging apparatus. The technique according to the present invention can also be applied to various electronic apparatuses that include such an imaging apparatus or an image processing apparatus (e.g., a portable telephone, a smartphone, a slate type terminal, or a personal computer). In the above embodiments, a configuration integrating the functions of the imaging processing apparatus in the main unit of the imaging apparatus was described, but the functions of the image processing apparatus may be configured in any manner. For example, the image processing apparatus may be embedded in a computer having the imaging apparatus, so that the computer acquires the image captured by the imaging apparatus, and executes the above mentioned image processing method based on this image. The image processing apparatus may be embedded in a computer that can access a network via cable or wireless, so that this computer acquires a plurality of images via the network and executes the above mentioned image processing method based on these images. The acquired depth information can be used for various types of image processing, such as the region division of an image, generation of a three-dimensional image or depth image, and emulation of a blur effect.

The image processing method can be installed in an apparatus as software (program) or as hardware. For example, various types of processing to achieve the object of the present invention may be implemented by storing a program in a computer (e.g., a microcomputer, or an FPGA) included in an imaging apparatus, or the like, and causing the computer to execute this program. It is also preferable to install a dedicated processor, such as an application specified integrated circuit (ASIC), to implement all of or part of the processing of the present invention by logic circuits.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. An image data processing apparatus comprising:
 (A) a memory that stores a program; and
 (B) a processor that executes the program to operate as:
  (a) an image data acquisition unit configured to acquire low resolution image data, and high resolution image data, wherein the high resolution image data is image data generated by up-sampling the low resolution image data;
  (b) a confidence data determination unit configured to determine confidence data that indicates a level of confidence in a pixel value in the high resolution image data, wherein the confidence data determination unit is configured to determine the level of confidence in a pixel value of a target pixel in the high resolution image data based on a comparison between a first evaluation value and a second evaluation value, wherein the first evaluation value is determined based on pixel values of neighboring pixels in a pixel position in the low resolution image data corresponding to a pixel position of the target pixel in the high resolution image data, and the second evaluation value is determined based on the pixel values of the neighboring pixels, using a method that is different from the method used for determining the first evaluation value; and (c) a correction unit configured to correct pixels in which the level of confidence is a first value and not to correct pixels in which the level of confidence is a second value that is less than the first value, in the high resolution image data.

2. The image data processing apparatus according to claim 1, wherein the processor further operates as an up-sampling unit configured to up-sample image data, wherein the image data acquisition unit is configured to acquire first high resolution image data by up-sampling the low resolution image data by the up-sampling unit using a first interpolation method, and to acquire second high resolution image data by up-sampling the low resolution image data by the up-sampling unit using a second interpolation method that is different from the first interpolation method, and wherein the confidence data determination unit is configured to use the pixel value of the target pixel in the first high resolution data as the first evaluation value, and to use the pixel value of the second high resolution image data corresponding to the target pixel as the second evaluation value.

3. The image data processing apparatus according to claim 2, wherein the processor further operates as a correction unit configured to correct the first high resolution image data based on photographed image data and the confidence data.

4. The image data processing apparatus according to claim 2, wherein the first interpolation method is bilinear interpolation, and the second interpolation method is nearest-neighbor interpolation.

5. The image data processing apparatus according to claim 2, wherein the image data acquisition unit is configured to acquire either the first high resolution image data or the second high resolution image data as the high resolution image data.

6. The image data processing apparatus according to claim 1, wherein the low resolution image data and the high resolution image data are depth image data, motion image data, or segmentation image data.

7. The image data processing apparatus according to claim 1, wherein the confidence data determination unit is configured:

to determine, as the first evaluation value, a weighted mean value using a first weight coefficient, of the pixel values of the neighboring pixels in the low resolution image data; and to determine, as the second evaluation value, a weighted mean value using a second weight coefficient, which is different from the first weight coefficient, of the pixel values of the neighboring pixels in the low resolution image data.

8. The image data processing apparatus according to claim 7, wherein the first weight coefficient and the second weight coefficient are determined in accordance with a depth from a pixel in the low resolution image data corresponding to the target pixel in the high resolution image data.

9. The image data processing apparatus according to claim 8, wherein one of the first weight coefficient and the second weight coefficient is determined such that a weight of a pixel, out of the neighboring pixels, which is nearest to the pixel in the low resolution image data corresponding to the target pixel in the high resolution image data, is one, and weights of other pixels are zero.

10. The image data processing apparatus according to claim 8, wherein at least one of the first weight coefficient and the second weight coefficient is determined by a Gaussian function in accordance with the depth from the pixel in the low resolution image data corresponding to the target pixel in the high resolution image data.

11. The image data processing apparatus according to claim 8, wherein one of the first weight coefficient and the second weight coefficient is determined to be a value that is in inverse proportion to the depth from the pixel in the low resolution image data corresponding to the target pixel in the high resolution image data.

12. The image data processing apparatus according to claim 1, wherein the level of confidence is binary information that indicates whether a pixel value is reliable or not, and wherein the confidence data determination unit is configured to determine the level of confidence in the target pixel as a level of confidence indicating that the target pixel is reliable when a difference between the first evaluation value and the second evaluation value is a predetermined threshold or less, and determines the level of confidence in the target pixel as a level of confidence indicating that the target pixel is unreliable when the difference is greater than the predetermined threshold.

13. The image data processing apparatus according to claim 1, wherein the confidence data determination unit is configured to determine the level of confidence in the target pixel so that the level of confidence is lower as a difference between the first evaluation value and the second evaluation value is greater.

14. The image data processing apparatus according to claim 12, wherein the predetermined threshold is set based on data resolution of the low resolution image data, an allowable error amount, or an allowable depth change.

15. The image data processing apparatus according to claim 1, wherein the processor further operates as a correction unit configured to correct the high resolution image data based at least partially on the level of confidence.

16. The image data processing apparatus according to claim 15, wherein the correction unit corrects only pixels in which the level of confidence is a threshold or less, out of the pixels in the high resolution image data.

17. The image data processing apparatus according to claim 15, wherein the correction unit corrects the high resolution image data also based on the low resolution image data, and image data that corresponds to the high resolution image data and has the same resolution as the high resolution image data.

18. An imaging apparatus comprising:

an image pickup element on which an image of incident light is formed on an image plane; and the image data processing apparatus according to claim 1, wherein the image data acquisition unit is configured to acquire photographed image data from the image pickup element, to generate the low resolution image data from the photographed image data, and to acquire the high resolution image data by expanding the low resolution image data.

19. An image data processing method performed by an image data processing apparatus, the method comprising:
   an image data acquisition step of acquiring low resolution image data, and high resolution image data that is image data generated by up-sampling the low resolution image data;
   a confidence data determination step of determining confidence data that indicates a level of confidence in a pixel value in the high resolution image data, wherein, in the confidence data determination step, a first evaluation value is determined based on neighboring pixels of a pixel in the low resolution image data corresponding to a pixel position of a target pixel in the high resolution image data, a second evaluation value is determined based on the neighboring pixels of the pixel in the low resolution image data corresponding to a pixel position of the target pixel in the high resolution image data, using a method that is different from the method used for determining the first evaluation value, and the level of confidence in the target pixel in the high resolution image data is determined based on a comparison between the first evaluation value and the second evaluation value; and
   a correction step of correcting pixels in which the level of confidence is a first value and not to correct pixels in which the level of confidence is a second value that is less than the first value, in the high resolution image data.

* * * * *